United States Patent
Kuo et al.

(10) Patent No.: US 8,069,454 B2
(45) Date of Patent: Nov. 29, 2011

(54) EMERGENCY EJECTION DEVICE FOR A SLOT-IN DISK DRIVE

(75) Inventors: Yao-Ting Kuo, Taoyuan County (TW); Jen-Chen Wu, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 290 days.

(21) Appl. No.: 12/581,162

(22) Filed: Oct. 19, 2009

(65) Prior Publication Data

US 2010/0162279 A1 Jun. 24, 2010

(30) Foreign Application Priority Data

Dec. 22, 2008 (TW) ............................... 97150177 A (51) Int. Cl.
*G11B 17/04* (2006.01)
(52) U.S. Cl. ..................................................... 720/620
(58) Field of Classification Search .................. 720/609, 720/617, 619–623, 636–638
See application file for complete search history.

(56) References Cited

U.S. PATENT DOCUMENTS

| 7,197,753 B2* | 3/2007 | Yokota | 720/637 |
| 2007/0124743 A1* | 5/2007 | Kuo et al. | 720/617 |
| 2007/0186219 A1* | 8/2007 | Wang et al. | 720/607 |
| 2008/0010650 A1* | 1/2008 | Fujisawa | 720/623 |
| 2009/0199223 A1* | 8/2009 | Ahn et al. | 720/608 |

FOREIGN PATENT DOCUMENTS

JP 11149691 A * 6/1999

OTHER PUBLICATIONS

Machine-Assisted Translation of JP 11149691 A.*

* cited by examiner

*Primary Examiner* — Nathan Danielsen
(74) *Attorney, Agent, or Firm* — Winston Hsu; Scott Margo (57) ABSTRACT

The invention provides an emergency ejection device for a slot-in disk drive, which rotates a worm gear by a motor. A central hole of a rotating component is fixed on a housing. A sliding slot is formed on an end of the rotating component, and a buckling slot is formed on an end of the sliding slot. A first gear of a gear set fixed on the central hole of the rotating component is engaged with the worm gear. A clutching gear fixed on the other end of the rotating component is engaged with the first gear. An end of a locking component inserts inside the sliding slot, and an inclined surface protrudes from the other end of the locking component. A spring provides an elastic force for holding the sliding column inside the buckling slot so as to keep engagement of the clutching gear with a second gear.

12 Claims, 6 Drawing Sheets

EMERGENCY EJECTION DEVICE FOR A SLOT-IN DISK DRIVE

BACKGROUND OF THE INVENTION

1. Field of the Invention

The present invention relates to an ejection device, and more particularly, to an emergency ejection device for a slot-in disk drive capable of ejecting an optical disk manually in an emergency, such as a breakdown or power failure of the slot-in disk drive.

2. Description of the Prior Art

A conventional slot-in disk drive utilizes a driving motor to rotate a gear set. The gear set drives a sliding component to move forward and backward inside the slot-in disk drive. In addition, a guiding slot of the sliding component is for driving a plurality of bars to guide an optical disk to slide in/out the slot-in disk drive and for driving a traverse to load/unload the optical disk. If the slot-in disk drive has a breakdown or power failure, the optical disk can not be ejected out of the slot-in disk drive.

Figure 1:
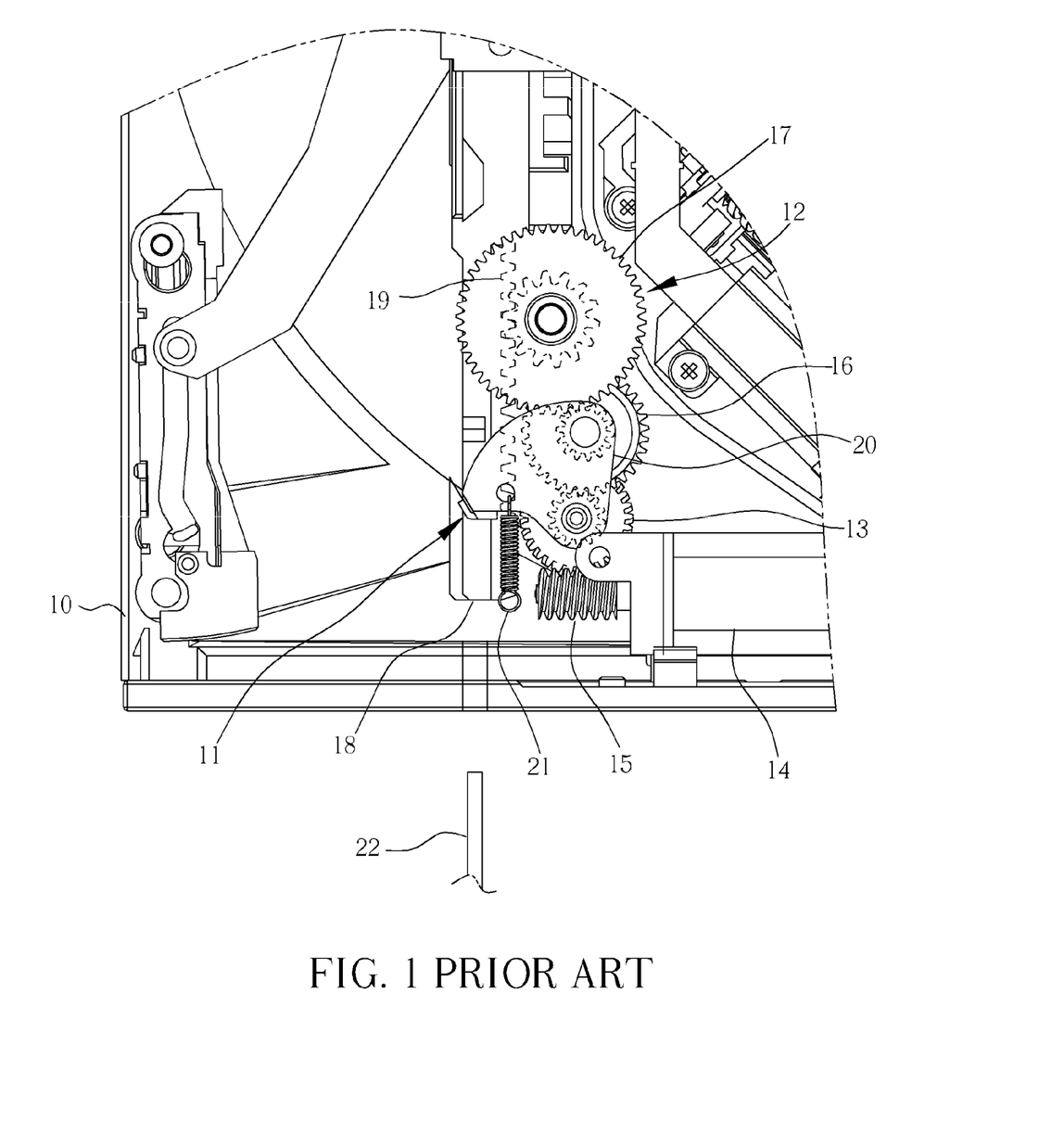
FIG. 1 is an enlarged sectional diagram of an emergency ejection device for a slot-in disk drive in the prior art.

Please refer to FIG. 1. FIG. 1 is an enlarged sectional diagram of an emergency ejection device for a slot-in disk drive 10 disclosed in U.S. patent publication No. 20070124743 in the prior art. The slot-in disk drive 10 includes an emergency ejection device 11 for ejecting the optical disk when the slot-in disk drive 10 has a breakdown or power failure. The emergency ejection device 11 includes a gear set 12. The gear set 12 includes a first gear 13 engaged with a worm gear 15 of a driving motor 14. The gear set 12 further includes a clutching gear 16 and a second gear 17 engaged with the clutching gear 16. The first gear 13 drives the second gear 17 via the clutching gear 16. The second gear 17 is further engaged with a rack 19 of a sliding component 18. The driving motor 14 drives the sliding component 18 to move forward and backward inside the slot-in disk drive 10 for sliding in/out the optical disk.

Due to the self-locking function of the engagement of the worm gear 15 and the first gear 13, the gear set 12 cannot rotate the worm gear 15. The emergency ejection device 11 includes a rotating plate 20. An end of the rotating plate 20 is pivoted to a shaft of the first gear 13, and the other end of the rotating plate 20 is for holding the clutching gear 16 engaged with the first gear 13. A spring 21 rotates the rotating plate 20 so as to engage the clutching gear 16 with the second gear 17. When the optical disk needs to be ejected, a stick 22 is utilized for rotating the rotating plate 20 in reverse of an elastic force of the spring 21, so that the clutching gear 16 is disengaged form the second gear 17 to stop driving the gear set 12, and the second gear 17 and the sliding component 18 engaged with the second gear 17 are not locked by the worm gear 15. Then, the stick 22 pushes the sliding component 18 continuously to eject the optical disk out of the slot-in disk drive 10.

However, the emergency ejection device 11 utilizes the spring 21 to provide the elastic force to engage the clutching gear 16 with the second gear 17 for driving the gear set 12. When the gear set 12 operates at a high speed or is crashed, the clutching gear 16 causes jumping teeth easily, which not only has loud noise but also positions the optical disk inaccurately. For solving the above-mentioned problem, the elastic force of the spring 21 can be increased for engaging the clutching gear 16 with the second gear 17 tightly, but the emergency ejection device 11 is hard to eject the optical disk in emergency. Thus, design of an emergency ejection device for the slot-in disk drive capable of ejecting the optical disk easily is an important issue in the computer industry.

SUMMARY OF THE INVENTION

An objective of the invention is to provide an emergency ejection device for a slot-in disk drive capable of utilizing a locking component to constrain a movement of a clutching gear so as to prevent the clutching gear from failing for solving above drawbacks.

Another objective of the claimed invention is to provide the emergency ejection device for the slot-in disk drive, rotating an inclined surface slightly so that the locking component rotates a rotating component easily for ejecting an optical disk conveniently.

In order to achieve the foregoing objectives of the invention, a driving motor drives a worm gear. A central hold of the rotating component is fixed on a housing. A sliding slot is formed on an end of the rotating component, and a fixing hole is formed on the other end of the rotating component. A buckling slot is formed on an end of the sliding slot. A first gear of a gear set fixed on the central hole of the rotating component is engaged with the worm gear. The clutching gear fixed on the fixing hole is engaged with the first gear. A second gear fixed on the housing is engaged with the clutching gear. The locking component is fixed on the housing via its central hole. A sliding column protrudes from an end of the locking component and inserts into the sliding slot, and an inclined surface protrudes from the other end of the locking component. A spring provides an elastic force for holding the sliding column inside the buckling slot so as to constrain the buckling slot to move in a rotary direction of the rotating component and to keep engagement of the clutching gear with the second gear.

According to the claimed invention, the slot-in disk drive includes a sliding component. The locking component is located below the sliding component, and the locking component and the sliding component are positioned at the same height. An emergency ejecting hole is formed on the housing facing to the inclined surface. A line of force applying on the sliding column by the buckling slot in a rotary direction of the rotating component substantially is close to a central hole of the locking component when the rotating component is rotated, so that the sliding column moves along the sliding slot so as to rotate the rotating component for driving the clutching gear and the second gear to engage with or disengage from each other by inserting a stick into the emergency ejecting hole to push the inclined surface slightly These and other objectives of the present invention will no doubt become obvious to those of ordinary skill in the art after reading the following detailed description of the preferred embodiment that is illustrated in the various figures and drawings.

DETAILED DESCRIPTION

Figure 2:
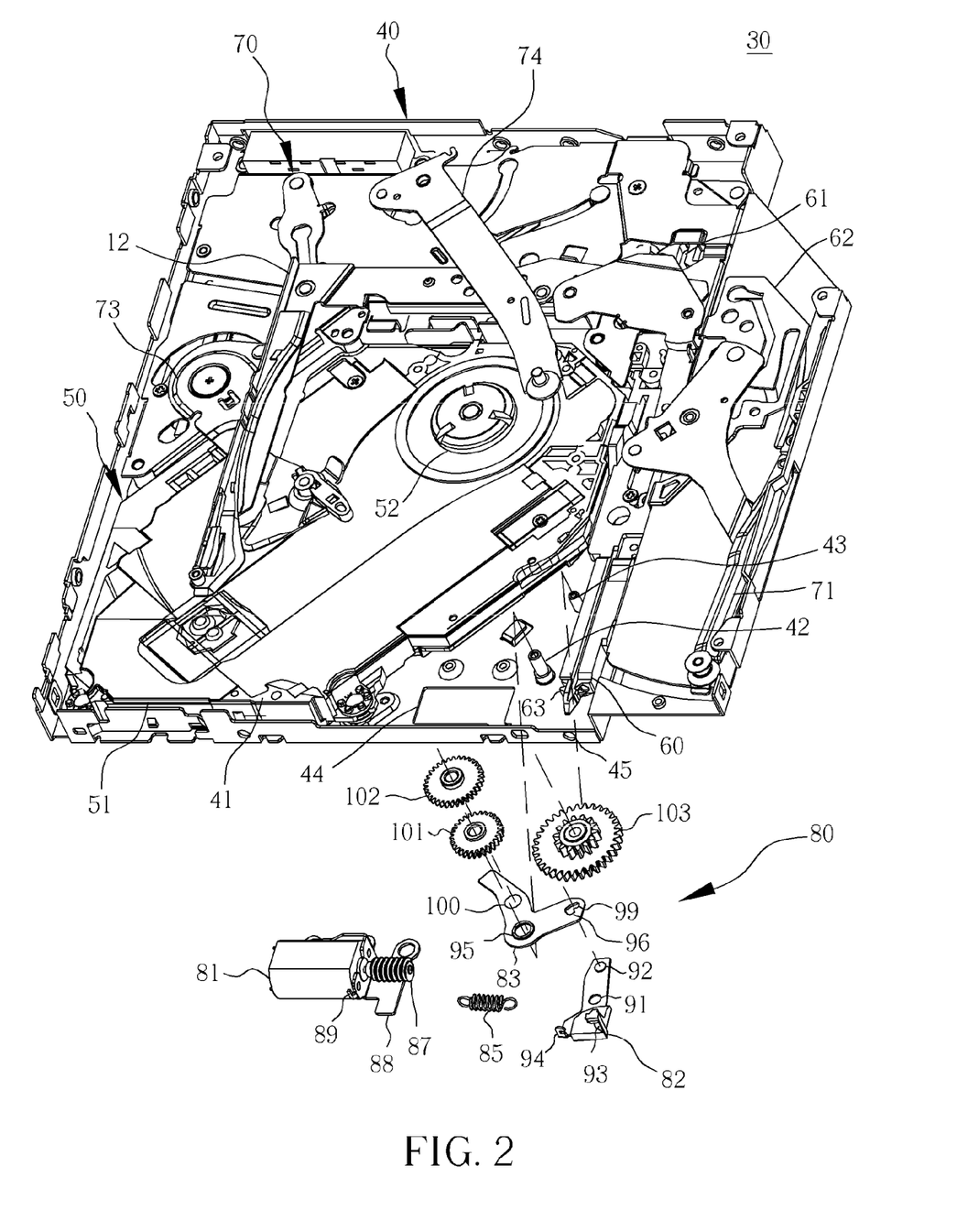
FIG. 2 is an exploded diagram of an emergency ejection device for a slot-in disk drive according to a preferred embodiment of the present invention.

Please refer to FIG. 2. FIG. 2 is an exploded diagram of an emergency ejection device 80 for a slot-in disk drive 30 according to a preferred embodiment of the present invention. The slot-in disk drive 30 includes a housing 40, a traverse 50, a sliding component 60, a loading/unloading device 70, and the emergency ejection device 80. A hollow space is formed inside the housing 40, and an opening 41 is formed on a front end of the housing 40 for loading or ejecting an optical disk (not shown in FIG. 1). A first fixing column 42 and a second fixing column 43 protrude from a bottom of the housing 40 adjacent to the opening 41. An installation slot 44 is formed on the bottom of the housing 40 along the opening 41. An emergency ejecting hole 45 is formed on a side of the housing 40 whereon the opening 41 is formed. The traverse 50 is disposed inside the hollow space of the housing 40. An end of the traverse 50 is pivoted to the side of the housing 40 whereon the opening 41 is formed, so as to form a pivoting end 51 for driving the traverse 50 to move upward and downward. The other end of the traverse 50 is for holding a spindle motor 52 located at a center of the housing 40.

The sliding component 60 can be a stick-shaped component. The sliding component 60 is disposed inside the housing 40 adjacent to a lateral side of the traverse 50 closely. A plurality of guiding slots 61 and a plurality of guiding plate 62 are formed on the sliding component 60. A rack 63 is formed on a front bottom of the sliding component 60. The loading/unloading device 70 includes a loading bar 71, an unloading bar 72, a determining bar 73, and a positioning bar 74, which are driven by a linkage structure or a cam structure for sliding in/out the optical disk via the guiding slot 61 and the guiding plate 62 of the sliding component 60. All methods of the loading/unloading device 70 utilizing the sliding component 60 to sliding in/out the optical disk are within the scope of the present invention, and detail description is omitted herein for simplicity.

The emergency ejection device 80 is disposed on the side of the housing 40 adjacent to the opening 41 and the sliding component 60. The emergency ejection device 80 includes a driving motor 81, a locking component 82, a rotating component 83, a gear set 84, and a spring 85. A worm gear 87 is disposed on a shaft of the driving motor 81. The driving motor 81 is disposed on a fixing base 88. A first hook 89 is disposed on a lateral side of the fixing base 88 adjacent to the driving motor 81. The locking component 82 can be a plate-shaped component. A central hole 91 is formed on a center of the locking component 82. A sliding column 92 protrudes from an end of the locking component 82, an inclined surface 93 protrudes from the other end of the locking component 82, and a second hook 94 is formed on a lateral end of the locking component 82.

The rotating component 83 can be a plate-shaped component. A central hole 95 is formed on a center of the rotating component 83. A sliding slot 96 is formed on an end of the rotating component 83, and a buckling slot 99 is formed on an end of the sliding slot 96. A fixing hole 100 is formed on the other end of the rotating component 83. The rotating component 83 includes two ends stretching out from the central hole 95 as a crook. An included angle is formed between the two ends of the rotating component 83. The gear set 84 includes a first gear 101, a clutching gear 102, and a second gear 103. Each gear includes two sub-gears with different dimensions connected to each other coaxially.

Figure 3:
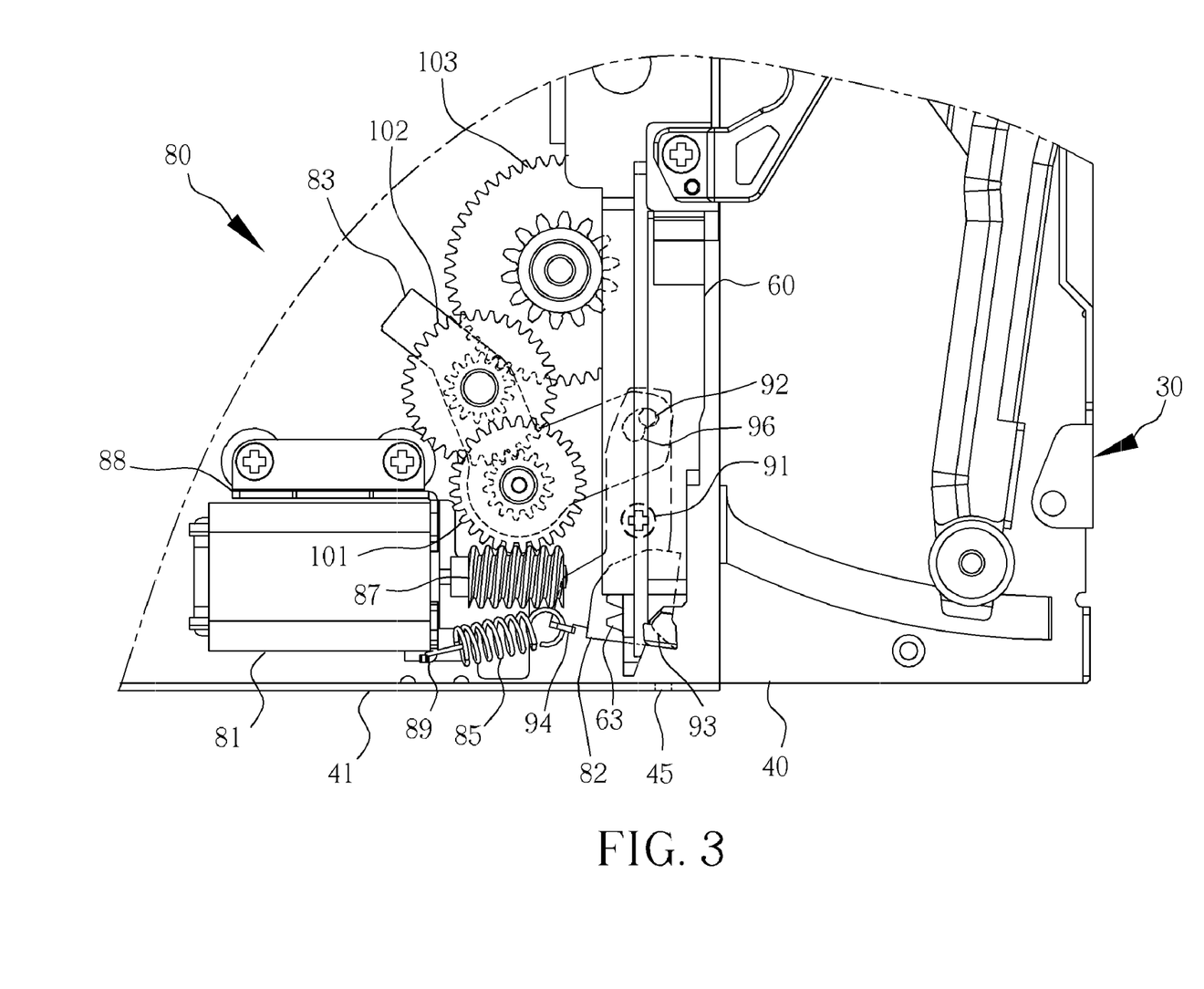
FIG. 3 is an enlarged sectional diagram of the emergency ejection device disposed inside the slot-in disk drive according to the preferred embodiment of the present invention.

Please refer to FIG. 2 and FIG. 3. FIG. 3 is an enlarged sectional diagram of the emergency ejection device 80 disposed inside the slot-in disk drive 30 according to the preferred embodiment of the present invention. For assembling the emergency ejection device 80, the fixing base 88 and the driving motor 81 are fixed on the installation slot 44 of the housing 40 first. Then, the central hole 91 of the locking component 82 can be fixed on the housing 40 adjacent to the driving motor 81 in a rotatable manner. The locking component 82 is located below the sliding component 60, so that the inclined surface 93 and the sliding component 60 are positioned at the same height. The inclined surface 93 faces to the emergency ejecting hole 45. An end of the spring 85 is fixed on the first hook 89 of the fixing base 88, and the other end of the spring 85 is fixed on the second hook 94 of the locking component 82. Method of fixing two ends of the spring 85 respectively is not limited to the above-mentioned embodiment. For example, the two ends of the spring 85 can further be fixed by welding or locking.

After that, the sliding slot 96 of the rotating component 83 inserts into the sliding column 92 of the locking component 82. The central hole 95 of the rotating component 83 and the first gear 101 insert into the first fixing column 42 of the housing 40 in a rotatable manner, so as to engage the first gear 101 with the worm gear 87. The clutching gear 102 is fixed on the fixing hole 100 of the rotating component 83 so as to keep the engagement of the clutching gear 102 with the first gear 101. Finally, the second gear 103 can be fixed on the second fixing column 43 in a rotatable manner, so that two sides of the second gear 103 can be engaged with the clutching gear 102 and the rack 63 of the sliding component 60 respectively when the optical disk is not ejected in emergency.

Figure 4:
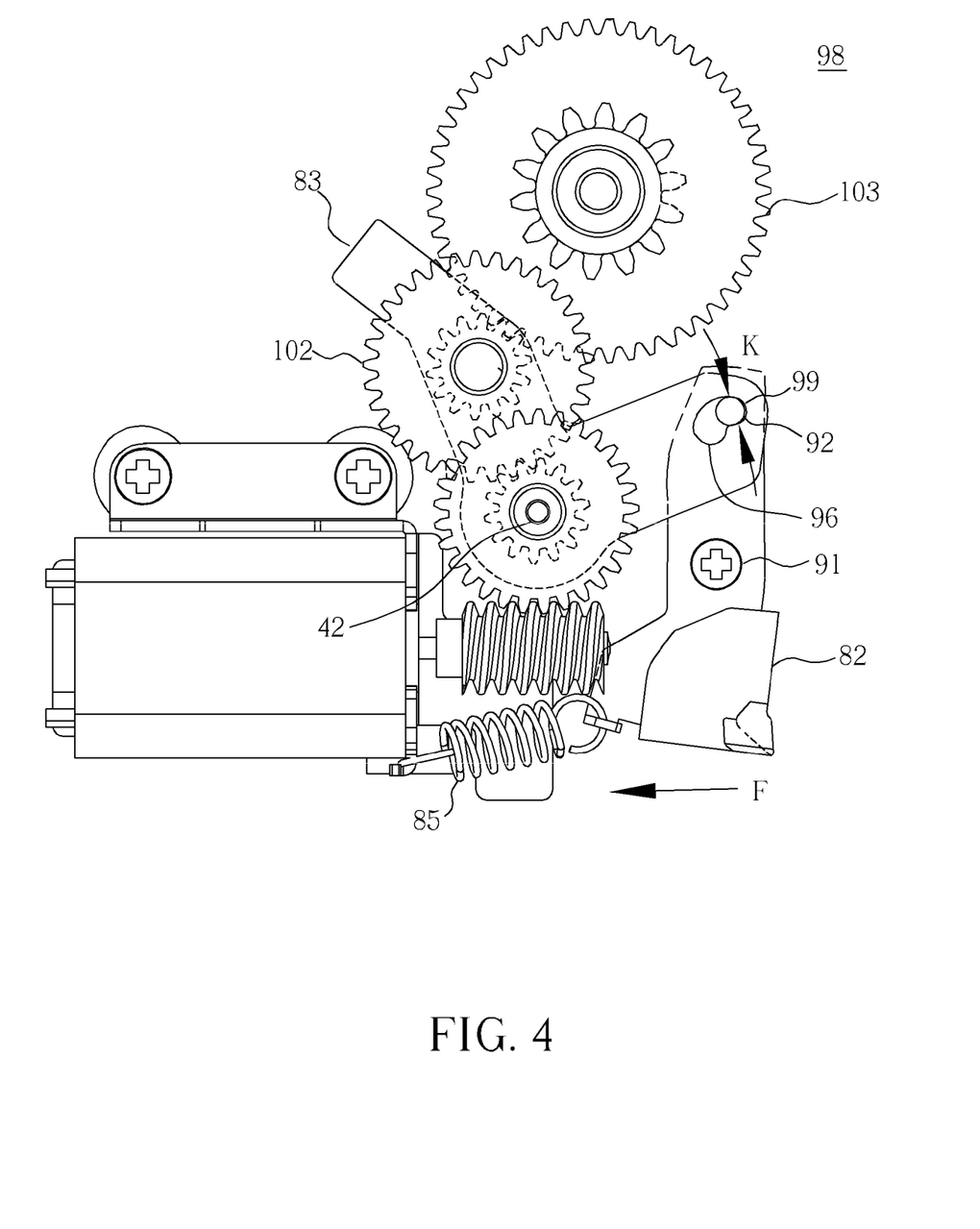
FIG. 4 is an assembly diagram of the emergency ejection device according to the preferred embodiment of the present invention.

Please refer to FIG. 4. FIG. 4 is an assembly diagram of the emergency ejection device 80 according to the preferred embodiment of the present invention. The spring 85 provides an elastic force to rotate the locking component 82 in a direction shown as an arrow F, so that the sliding column 92 of the locking component 82 enters into and holds inside the buckling slot 99 of the sliding slot 96. When the clutching gear 102 is pushed in a direction whereto the clutching gear 102 is disengaged from the second gear 103, the sliding slot 96 of the rotating component 83 is rotated around the first fixing column 42. The buckling slot 99 rotated with the sliding slot 96 can drive the sliding column 92 constrained inside the buckling slot 99 to move. A line of force applying on the sliding column 92, which is shown as an arrow K, by the buckling slot 99 in a rotary direction of the rotating component 83 substantially is close to the central hole 91 of the locking component 82 when the rotating component 83 is rotated, so that it is not easy to rotate the locking component 82. In addition, the spring 85 pulls the locking component 82 reversely, and the sliding column 92 blocks the buckling slot 99 to rotate, so that the clutching gear 102 keeps being engaged with the second gear 103 for preventing the clutching gear 102 and the second gear 103 from failing.

Figure 5:
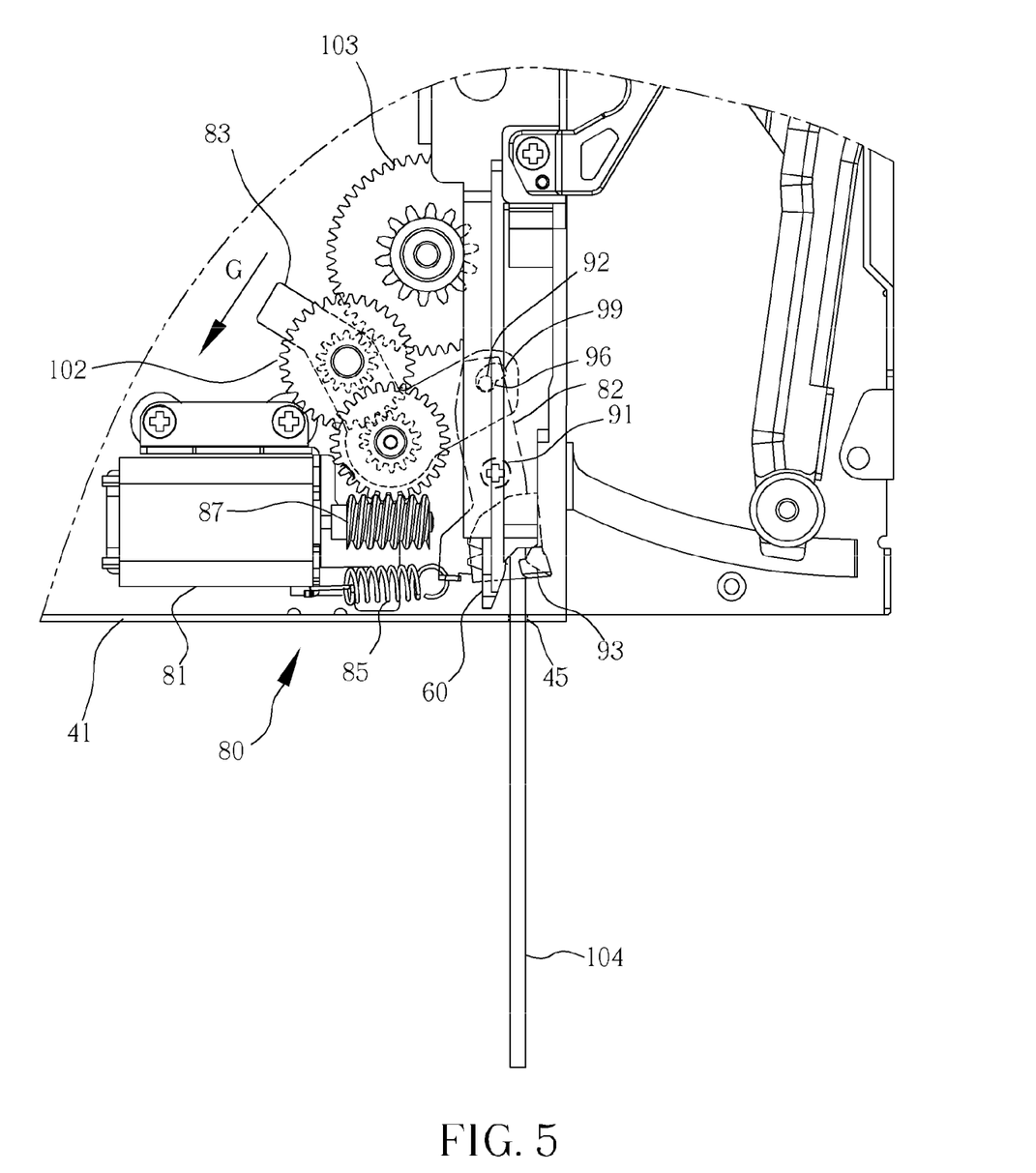
FIG. 5 and FIG. 6 are diagrams of different states of the emergency ejection device in ejecting process according to the preferred embodiment of the present invention, respectively.
Figure 6:
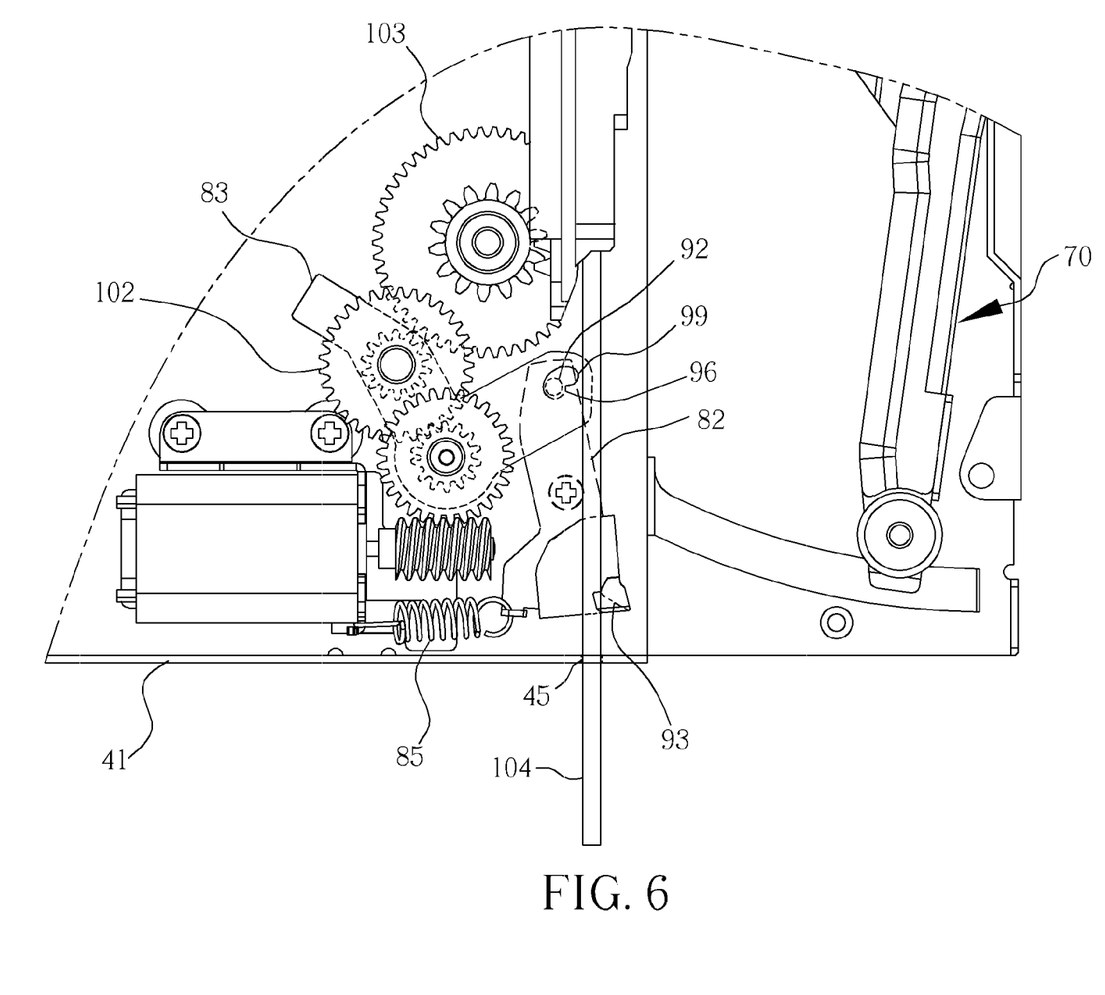

Please refer to FIG. 5 and FIG. 6. FIG. 5 and FIG. 6 are diagrams of different states of the emergency ejection device 80 in ejecting process according to the preferred embodiment of the present invention, respectively. When the optical disk is ejected in emergency, as shown in FIG. 5, a stick 104 inserts into the emergency ejecting hole 45 and pushes the inclined surface 93. A lateral force is applied on the inclined surface 93 for driving the locking component 82 to rotate against the elastic force of the spring 85 and around the central hole 91. Then, the inclined surface 93 rotates away from a path of the stick 104 when the locking component 82 is rotated. The stick 104 keeps inserting along the inclined surface 93 deeply to touch the sliding component 60 located at the same height with the inclined surface 93. At this time, the sliding column 92 departs from the buckling slot 99 along the sliding slot 96 by the rotating locking component 82 and drives the rotating component 83 to rotate via a shape of the sliding slot 96, so that the clutching gear 102 is disengaged from the second gear 103 in a direction shown as an arrow G. The worm gear 87 disposed on the shaft of the driving motor 81 is engaged with the clutching gear 102 and disengaged from the second gear 103. Therefore, the second gear 103 and the sliding component 60 engaged with the second gear 103 are not constrained by the worm gear 87 and can rotate freely.

As shown in FIG. 6, the stick 104 inserts continuously, the departing inclined surface 93 contacts against a lateral side of the stick 104, and the clutching gear 102 keeps being disengaged from the second gear 103. Thus, the sliding component 60 without the constraint can move toward a rear end of the slot-in disk drive 30 by the stick 104, so as to drive the loading/unloading device 70 to eject the optical disk out of the slot-in disk drive 30. The ejecting direction of the optical disk is not limited to the above-mentioned embodiment, and depends on actual demand. For example, the sliding component 60 can be pulled toward the front end of the slot-in disk drive 30 by the stick 104 for ejecting the optical disk.

After the optical disk is ejected in emergency, the stick 104 can be taken away so as to release the inclined surface 93 from the constraint. Then, the spring 85 pulls the locking component 82 so that the sliding column 92 moves to the buckling slot 99 along the sliding slot 96. The rotating component 83 is rotated along the shape of the sliding slot 96. After the sliding column 92 enters the buckling slot 99, the clutching gear 102 is engaged with the second gear 103, and the inclined surface 93 of the locking component 82 rotates backward to the emergency ejecting hole 45. Therefore, the emergency ejection device 80 can recover to an initial state.

Comparing to the prior art, the emergency ejection device for the slot-in disk drive of the present invention can constrain a movement of the clutching gear by the buckling slot and prevent the clutching gear and the second gear from failing so as to improve reliability of the slot-in disk drive, and can further decrease driving noise. In addition, the emergency ejection device for the slot-in disk drive of the present invention can rotate the inclined surface slightly so as to drive the locking component to release the rotating component, so that the clutching gear can be disengaged from the second gear for ejecting the optical disk conveniently and rapidly in an emergency.

Those skilled in the art will readily observe that numerous modifications and alterations of the device and method may be made while retaining the teachings of the invention.

What is claimed is:

1. An emergency ejection device for a slot-in disk drive, the slot-in disk drive comprising a housing and a sliding component, the emergency ejection device comprising:
    a driving motor disposed inside the housing for driving a worm gear;
    a rotating component, a central hole of the rotating component being fixed on the housing in a rotatable manner, a sliding slot being formed on an end of the rotating component, a fixing hole being formed on the other end of the rotating component, and a buckling slot being formed on an end of the sliding slot;
    a gear set comprising:
        a first gear disposed on the central hole of the rotating component and engaged with the worm gear;
        a clutching gear disposed on the fixing hole and engaged with the first gear; and
        a second gear fixed on the housing and engaged with the clutching gear;
    a locking component disposed on the housing via a hole in a rotatable manner, a sliding column protruding from an end of the locking component and inserting inside the sliding slot, and an inclined surface protruding from the other end of the locking component; and
    a spring, an end of the spring being fixed on a lateral side of the driving motor and the other end of the spring being fixed on a side of the locking component adjacent to the inclined surface;
    wherein the spring provides an elastic force for holding the sliding column inside the buckling slot so as to constrain the buckling slot to move in a rotary direction of the rotating component and to keep engagement of the clutching gear with the second gear.

2. The emergency ejection device of claim 1, wherein the driving motor is disposed on a fixing base, and a first hook is disposed on the fixing base adjacent to a lateral side of the driving motor for fixing the spring.

3. The emergency ejection device of claim 1, wherein a second hook is disposed on the end of the locking component whereon the inclined surface is formed for fixing the spring.

4. The emergency ejection device of claim 1, wherein the rotating component comprises two ends stretching out from the central hole as a crook.

5. The emergency ejection device of claim 1, wherein the locking component is located below the sliding component so that the inclined surface and the sliding component are positioned at the same height.

6. The emergency ejection device of claim 1, wherein an emergency ejecting hole is formed on the housing facing to the inclined surface.

7. The emergency ejection device of claim 1, wherein the sliding column moves along the sliding slot so as to rotate the rotating component for driving the clutching gear and the second gear to engage with or disengage from each other.

8. The emergency ejection device of claim 7, wherein the sliding column moves away from the buckling slot so that the rotating component rotates to drive the clutching gear to disengage from the second gear.

9. An emergency ejection device for a slot-in optical disk drive, the slot-in optical disk drive comprising a housing and a sliding component, the emergency ejection device comprising:
    a driving motor disposed inside the housing for driving a worm gear;
    a rotating component, a central hole of the rotating component and a first gear engaged with the worm gear being disposed on the housing in a rotatable manner, a sliding slot being formed on an end of the rotating component, a buckling slot being formed on an end of the sliding slot, and a clutching gear engaged with the first gear being disposed on the other end of the rotating component;
    a second gear fixed on the housing and engaged with the clutching gear;
    a locking component disposed on the housing via a hole in a rotatable manner, a sliding column protruding from an end of the locking component and inserting inside the sliding slot, and an inclined surface protruding from the other end of the locking component; and
    a spring, an end of the spring being disposed on a lateral side of the driving motor and the other end of the spring being disposed on a side of the locking component adjacent to the inclined surface;

wherein the spring provides an elastic force for holding the sliding column inside the buckling slot so as to constrain the buckling slot to move in a rotary direction of the rotating component and to keep engagement of the clutching gear with the second gear, and a line of force applying on the sliding column by the buckling slot in a rotary direction of the rotating component substantially is close to a central hole of the locking component when the rotating component is rotated.

10. The emergency ejection device of claim 9, wherein the locking component is located below the sliding component so that the inclined surface and the sliding component are positioned at the same height.

11. The emergency ejection device of claim 9, wherein an emergency ejecting hole is formed on the housing facing to the inclined surface.

12. The emergency ejection device of claim 9, wherein the sliding column moves along the sliding slot so as to rotate the rotating component for driving the clutching gear and the second gear to engage with or disengage from each other.

* * * * *